United States Patent
Matsuda et al.

[11] Patent Number: 5,953,449
[45] Date of Patent: Sep. 14, 1999

[54] MEASURING APPARATUS AND MEASURING METHOD

[75] Inventors: Hisashi Matsuda, Yokohama; Takeshi Watanabe, Naka-gun; Fumio Otomo, Zama, all of Japan

[73] Assignee: Kabushiki Kaisha Toshiba, Kawasaki, Japan

[21] Appl. No.: 08/818,669

[22] Filed: Mar. 14, 1997

[30] Foreign Application Priority Data

Mar. 15, 1996 [JP] Japan .................................. 8-059691

[51] Int. Cl.$^6$ ...................................................... G06K 9/00
[52] U.S. Cl. ............................................ 382/162; 382/167
[58] Field of Search ..................................... 382/162, 167

[56] References Cited

U.S. PATENT DOCUMENTS

5,526,148  6/1996  Moffat et al. ............................. 359/43

FOREIGN PATENT DOCUMENTS

61-044307  3/1986  Japan .
63-290903  11/1988  Japan .

OTHER PUBLICATIONS

Kimura et al., Proceeding of Japan Visualiztion Association, vol. 12, Suppl. No. 1, 7–10 (1992).
Farina et al., "Illuminant Invariant Calibration of Thermochromic Liquid Crystals", Exp. Thermal Fluid Sci., 9, 1–12 (1994).

*Primary Examiner*—Phuoc Tran
*Attorney, Agent, or Firm*—Foley & Lardner

[57] ABSTRACT

The disclosed measuring apparatus can measure a predetermined physical quantity (e.g., temperature) of a coloring member (e.g., liquid crystal) whose color condition changes according to change of the physical quantity. The measuring apparatus comprises: a coloring member (2) whose color condition changes according to change of a predetermined physical quantity; a color detecting section (5) for detecting the color condition of the coloring member; a data base section (8) for constructing a three-dimensional color space (10) having three coordinate axes each corresponding to each of tristimulus values of color of the coloring member, relationship between the predetermined physical quantity and the tristimulus values being represented in the three-dimensional color space; and a physical quantity calculating section (9) for calculating the physical quantity of an object (1) to be measure on the basis of the tristimulus values of color of the coloring member detected by the color detecting section (5) and with reference to the data base section (8).

23 Claims, 12 Drawing Sheets a) COLOR-TEMPERATURE CALIBRATION
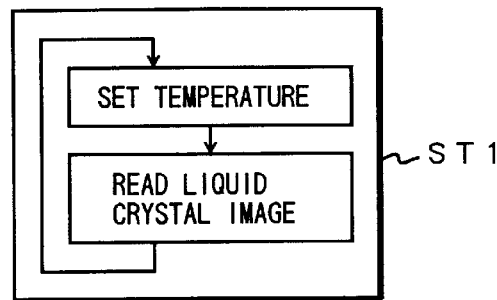
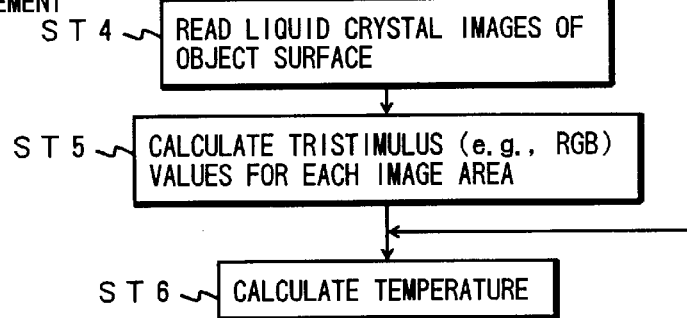
MEASURING FLOWCHART
FIG. 6

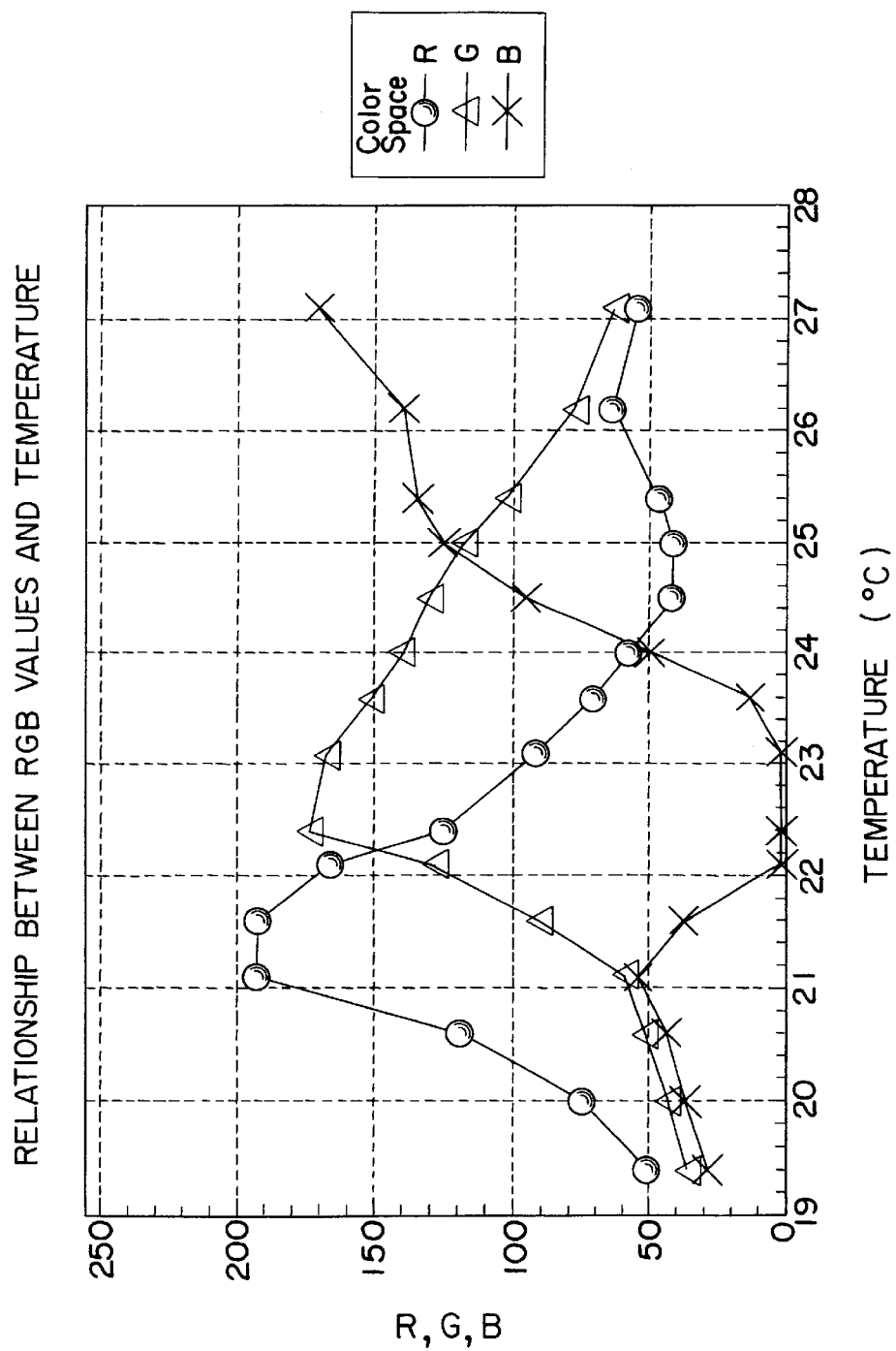
F I G. 7 a) COLOR-FLYING HEIGHT CALIBRATION
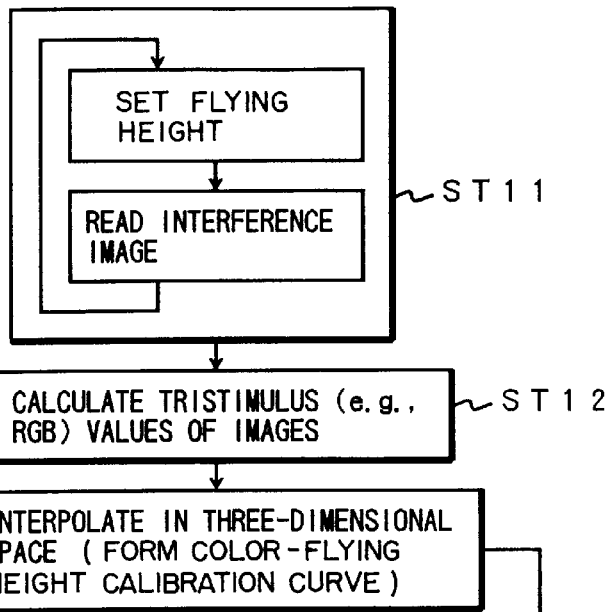
b) FLYING HEIGHT MEASUREMENT
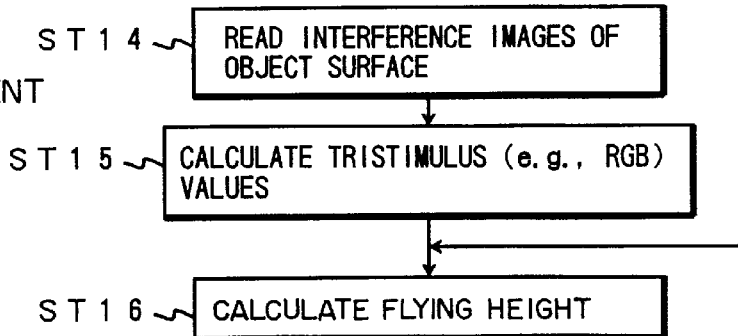
FIG. 14

MEASURING APPARATUS AND MEASURING METHOD

BACKGROUND OF THE INVENTION

1. Field of the Invention

The present invention relates to a measuring apparatus and a measuring method of detecting color condition of a coloring member (e.g., a thermo-sensible liquid crystal) whose color condition changes according to change of physical quantity (e.g., temperature), and for calculating the physical quantity thereof on the basis of tristimulus values of the color of the coloring member.

2. Description of the Prior Art

A prior art temperature measuring apparatus related to the present invention will be described hereinbelow by taking an example of thermo-sensible liquid crystal which is widely used as a coloring member whose color condition changes according to change of the physical quantity thereof.

When various products are searched or designed, there are many cases where it is required to know a wide temperature distribution on or over the surface of an object. In these cases, in general, it is necessary to arrange a number of thermometers (e.g., thermo couples) for measuring the temperature distribution on or over the surface of the object to be measured. In this method, however, when the thermometers are arranged in contact with the object to be measured, the object to be measured is subjected to unnecessary disturbance. Therefore, when there exists an air flow in the vicinity of the surface of the object, there arises a problem in that the temperature field of the measured object is distorted due to the disturbance caused by the thermometers themselves. In addition, there exists such a difficulty that the measurement points must be previously specified on the surface of the measured object. Further, as a matter of course, there exists a limit of the number of the measurement points, because data obtained at the measurement points must be all processed.

On the other hand, there exists a non-contact surface measurement method, for instance such as radiation thermometer or infrared thermo-camera. In this method, the temperature distribution can be measured in a relatively wide range. In this non-contact method, however, the cost of the instrument is as high as several millions yen or higher.

Due to the above-mentioned background, as a relatively low-costly method of measuring a temperature field extending in two- or three-dimensions on the surface of an object to be measured, a method of using a liquid crystal (thermo-sensible liquid crystal) having such a feature that the color changes according to temperature thereof has been widely developed. In this method, the measured color data are detected by a CCD camera and then inputted to a computer for image processing.

In the method of using a thermo-sensible liquid crystal, wide temperature data can be obtained on the basis of the correspondence between the color and the temperature obtained by quantitatively processing the color change of the liquid crystal. In this method, however, since the relationship between the color data (e.g., RGB values) and the temperature is represented by an extremely complicated non-linear function in general as shown in FIG. 7, various methods of deciding the color and the temperature unequivocally and quantitatively have been so far proposed.

For instance, Kasagi, et al., have succeeded in obtaining an isothermal line on a measured surface by irradiating the liquid crystal surface with a monochromatic light source and by clearly visualizing only the temperature range corresponding to a wavelength (Kasagi, Hirata, Kumata; JSME International Journal Series B, Vol. 48 No. 430 (1982)).

Further, Kunugi, et al. have developed the Kasagi's method by use of white light having a uniform spectrum as the light source and by use of a plurality of optical filters each having an extremely narrow transmission wavelength range, to decide each isothermal line which corresponds to each transmission wavelength in sequence, so that a plurality of isothermal lines can be obtained in sequence by a single experiment (Kunugi, Ueda, Akino; JSME International Journal Series B, Vol. 53 No. 485 (1987)).

Further, recently, Kimura et al. have reported a method of obtaining the correspondence between temperature and color by allowing a neural network to learn the RGB values of the color image data changing according to temperature (Kimura, Uchide, Ozawa; Proceeding of Japan Visualization Association Vol. 12, Suppl. No. 1, pp. 7–10 (1992)).

Further, Farina, et al. have proposed such a method of obtaining the correspondence between color and temperature by obtaining HSI values (Hue, Saturation, and Intensity) of the color image data changing according to temperature and by noting the Hue values having a wide one-valued function range with respect to temperature (Farina, Hacker, Moffat. Eaton; Exp. Thermal Fluid, Sci. 9,1–12. (1994)).

In the Kasagi et al. method, however, it is necessary to set the heat transfer surface to various temperature levels in order to obtain a plurality of isothermal lines. Further, in the Kunugi et al. method which improves the Kasagi et al. method, although a plurality of isothermal ranges can be decided by only a single experiment, since a number of filters are necessary, there exists a problem in that the measurement work is rather complicated.

Further, in the Kimura et al. method, although the subsidiary devices such as filters can be eliminated, since a plurality of learning patterns must be determined and further a great number of learning operations must be repeated, there arises another problem in that a relatively long time is needed in the pre-processing.

Further, in the Farina et al. method, although the corresponding range between color and temperature can be tended on the basis of the newly-defined Hue values, the range where temperatures and Hue values can be represented on the basis of a one-valued function cannot be extended all over the coloring area, so that this method is not a method of measuring the temperature of the liquid crystal all over the coloring area of the liquid crystal, with the result that the measured temperature range is inevitably narrowed.

As described above, in the temperature measuring methods using the thermo-sensible liquid crystal so far proposed, there have been various problems in that complicated processing is necessary to obtain the correspondence between color data and temperature and in addition the colored area of the thermo-sensible liquid crystal is not sufficiently utilized.

In addition, in the prior art magnetic disk apparatus, there exists the following problem when a gap width between an magnetic head and a magnetic disk is measured:

Prior to the description of this problem, a flying head slider used for the magnetic disk apparatus will be explained hereinbelow, as an example of the prior art measuring apparatus used for the magnetic disk apparatus.

In the case of a magnetic disk apparatus used as an external memory apparatus of a computer, it is necessary to fly the magnetic head from the magnetic disk by a micro height in data recording and reading operation. With the advance of the high density of the magnetic disk apparatus, recently, this flying height has become as small as 0.1um or less.

Here, since the change of the flying height of the magnetic head is directly related to a recording characteristic of the apparatus, it is important to check whether the magnetic head can be kept-flown by a micro distance away from the magnetic disk during the development or researching of the recording apparatus as described above.

As the method of measuring the micro gap such as the flying height of the magnetic head from the magnetic disk, a method has been so far proposed, by which light of a known wavelength is irradiated upon a measured surface to obtain an interference fringe (or pattern) formed on the measured surface. In this method, however, there exists a problem in that the gap can be measured only when the gap corresponds to integer times of ¼ wavelength of the incident light.

To overcome this problem, Tanaka and Sugawara have proposed the following method, as disclosed in Japanese Published Unexamined (Kokai) Patent Application No. 61-44307. In this method, a gap between the magnetic head and the magnetic disk can be measured on the basis of an interference fringe as follows: the interference fringe can be obtained by irradiating white light onto the measured surface (e.g., the magnetic disk) through an optical head; the interference colors produced by the measured surface are photographed with the use of a TV camera; the hue components composed of R, G and B signals generated by the TV camera are obtained; and the obtained hue component values are compared with the reference values on the basis of the previously determined relationship between the gap and the hue component values by executing various calculations (as shown in FIG. 13).

Further, Kubo has proposed the following method, as disclosed in Japanese Published Unexamined (Kokai) Patent Application No. 63-290903. In this method, in the same way as above, the flying height of the magnetic head from the magnetic disk can be obtained, by irradiating light upon the measured surface, by photographing interference colors by a TV camera, by obtaining hue components on the basis of R, G and B signals obtained by the TV camera, and by comparing the obtained hue components with the reference hue components on the basis of the previously obtained relationship between the hue components and the gap.

Both the above-mentioned methods are different from each other only in the used transform formulae for obtaining hue values on the basis of R, G and B signals. In both the methods, the micro gap can be measured continuously. In these methods, however, when the hue values are obtained on the basis of the R, G and B signals, since the complicated discriminants are required according to the mutual relation between R, G and B signals, there still exists a problem in that complicated signal processing must be executed.

SUMMARY OF THE INVENTION

With these problems in mind, therefore, it is the object of the present invention to provide a measuring apparatus and measuring method, which can easily measure the physical quantity of a coloring member whose color condition changes according to change of a predetermined physical quantity, extending all over the coloring area thereof.

The present invention has been achieved to overcome the afore-mentioned various problems on the basis of the following considerations: Here, the gist of the invention will be described hereinbelow by taking the case where the coloring member is a liquid crystal, and the physical quantity is temperature.

When the relationship between color data and temperature is seen from the two-dimensional standpoint, in both the case where the RGB values are adopted and arranged as the color tristimulus values (as shown in FIG. 7) or the case where the $L^*a^*b^*$ values are adopted and arranged as the color tristimulus values (as shown in FIG. 8), the relationship between temperature and R, G and B values or $L^*$, $a^*$, $b^*$ values is usually represented as a multi-valued function, so that the correspondence between the temperature and the tristimulus values is very complicated.

To overcome this problem, although Farina et al. have proposed such a method of defining Hue values in order to represent the relationship between the color characteristics and the Hue values by use of a one-valued function, the range in which the relationship between the temperature and the Hue values can be represented as a one-valued function is limited to a small coloring area of the liquid crystal, with the result that the measurable temperature range is inevitably narrowed.

In contrast with this, the Inventors have found the following facts: when the data of color tristimulus values are arranged in three-dimensional space, the color data of the liquid crystal can be arranged continuously and further smoothly all over the coloring area of the liquid crystal according to change of the temperature. On the basis of the above-mentioned discovery, the Inventors have noticed that it is possible to allow the color tristimulus values to correspond to a physical quantity (e.g., temperature) on the basis of a one-valued function in a three-dimensional color space, while extending all over the coloring area of the liquid crystal.

Further, in the above-mentioned description, although the temperature is taken as an example of the physical quantity and further the liquid crystal is taken as an example of the coloring member. The gist of the present invention can be applied to many other cases, for instance as when the physical quantity is a gap width or a flying height between a first member (e.g., a magnetic head) and a second member (e.g., a magnetic disk) and the coloring member is an interference fringe formed when the above-mentioned gap is irradiated with light.

To achieve the above-mentioned object, the present invention provides a measuring apparatus, comprising: a coloring member whose color condition changes according to change of a predetermined physical quantity; color detecting means for detecting the color condition of said coloring member; a data base section for constructing a three-dimensional color space having three coordinate axes each corresponding to each of tristimulus values of color of said coloring member, relationship between the predetermined physical quantity and the tristimulus values being represented in the three-dimensional color space; and physical quantity calculating means for calculating the physical quantity of an object to be measure on the basis of the tristimulus values of color of said coloring member detected by said color detecting means and with reference to said data base section.

Further, it is preferable that said coloring means comprises: a color sensor for detecting the color condition of said coloring member; and calculating means for calculating the tristimulus values on the basis of the color condition detected by said color sensor.

Further, it is preferable that said color sensor is an image sensor for detecting the color condition at each spacial position of said coloring member; and said calculating means is image processing and calculating means for calculating the tristimulus values at each spacial position on the basis of the color condition at each spacial position detected by said color image sensor.

Further, it is preferable that said color image sensor detects the color condition at each spacial position at a plurality of pixels; and said calculating means calculates the tristimulus values at each spacial position by processing the color condition data detected at the pixels statistically.

Further, it is preferable that said color sensor is a color point sensor for detecting the color condition at each spacial position of said coloring member; and said calculating means is image processing and calculating means for calculating the tristimulus values at each spacial position on the basis of the color condition at each spacial position detected by said color point sensor.

Further, it is preferable that said data base section has a calibration line obtained by representing the relationship between the predetermined physical quantity and the tristimulus values in the three-dimensional color space.

Further, it is preferable that the predetermined physical quantity is obtained on the calibration line represented in the three-dimensional space as a one-valued function.

Further, it is preferable that the calibration line is a continuous line obtained by interpolating relationship between a plurality of the discrete physical quantities and a plurality of the discrete tristimulus values each corresponding to each of the discrete physical quantities.

Further, it is preferable that said data base section has an allowable error range pipe extending along the calibration line so as to enclose the calibration line in the three-dimensional color space.

Further, it is preferable that said physical quantity calculating means has calibration on-line discriminating means for discriminating whether the tristimulus values of the detected color of said coloring member lie on the calibration line or not.

Further, it is preferable that said physical quantity calculating means has allowable error range in-pipe discriminating means for discriminating whether the tristimulus values of the detected color of said coloring member lie in the allowable error range pipe or not.

Further, it is preferable that the predetermined physical quantity is temperature.

Further, it is preferable that said coloring member is a thermo-sensible liquid crystal member.

Further, it is preferable that said thermo-sensible member is sprayed onto a surface of an object to be measured.

Further, it is preferable that said thermo-sensible member is a sheet shaped liquid crystal member which is attached onto a surface of an object to be measured.

Further, it is preferable that said thermo-sensible member is mixed turbidly into an object to be measured.

Further, it is preferable that said coloring member is a gap formed between a first member and a second member so as to produce an interference pattern when irradiated by light.

Further, it is preferable that the first member is a head surface of a disk apparatus, and the second member is a disk surface.

Further, it is preferable that the first member is a semiconductor wafer whose flatness is to be measured, and the second member is a reference flatness body.

Further, it is preferable that the predetermined physical quantity is a gap width formed between the first member and the second member so as to produce an interference pattern when irradiated by light.

Further, it is preferable that the tristimulus values are RGB values.

Further, it is preferable that the tristimulus values are L*a*b* values.

Further, the present invention provides a measuring method, comprising the steps of: constructing a three-dimensional color space having three coordinate axes by allowing each value of tristimulus values of color to correspond to each of the coordinate axes; changing a predetermined physical quantity for a coloring member whose color condition changes according to change of the physical quantity; detecting the color condition of the coloring member to obtain the tristimulus values thereof according to various physical quantities; constructing a data base section by representing relationship between the various physical quantities and the tristimulus values in the three-dimensional color space; detecting the tristimulus values of the coloring member included in an object to be measured; and calculating the physical quantity of the object to be measured with reference to the data base section.

BRIEF DESCRIPTION OF THE DRAWINGS

FIG. 6 is a flowchart showing the measuring procedure of the first embodiment of the measuring method according to the present invention;

FIG. 7 is a graphical representation showing the relationship between temperature and color represented by the prior art RGB system;

FIG. 14 is a flowchart showing the measuring procedure of the second embodiment of the measuring method according to the present invention.

DETAILED DESCRIPTION OF THE PREFERRED EMBODIMENTS

Embodiments of the measuring apparatus of the present invention will be described hereinbelow with reference to the attached drawings.

Figure 5:
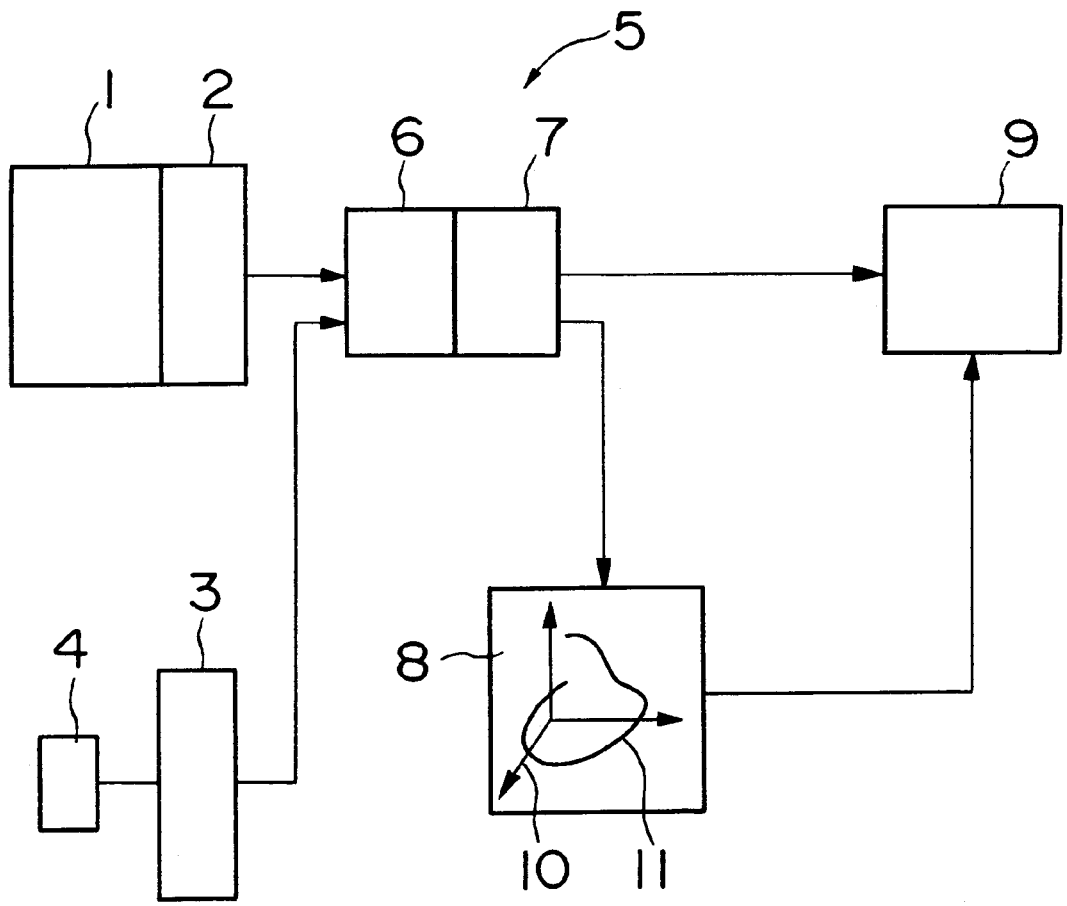
FIG. 5 is a block diagram showing a first embodiment of the measuring apparatus according to the present invention.
Figure 8:
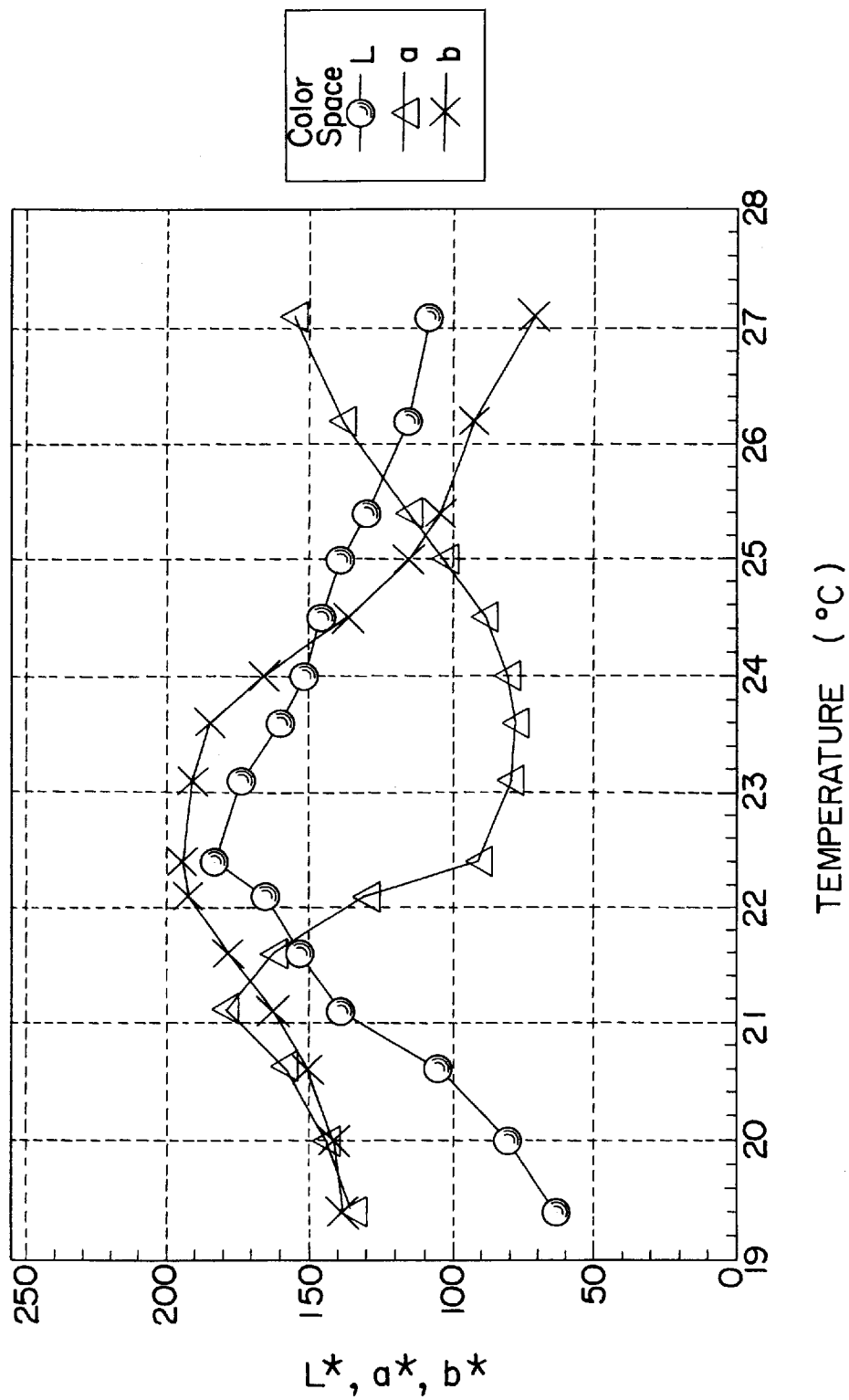
FIG. 8 is a graphical representation showing the relationship between temperature and color represented by the prior art L*a*b* system.

FIG. 5 is a block diagram showing a first embodiment of the measuring apparatus according to the present invention. In FIG. 5, the measuring apparatus comprises a coloring member 2 whose color condition changes according to change of a physical quantity, color detecting means 5 for detecting the color condition of the coloring member 2, a data base section 8, and physical quantity calculating means 9.

The coloring member 2 is a liquid crystal member whose color condition changes according to a physical quantity (eg., temperature) of the object 1 to be measured. The coloring member 2 is sprayed onto the surface of the object 1 to be measured or attached thereto as a sheet. Further, it is also possible to mix the coloring member 2 with a liquid object to be measured (e.g., water).

The color detecting means 5 is composed of a color CCD camera 6 (a color image sensor) and image processing and calculating means 7.

Further, when temperature at a point is required to be measured (without detecting the temperature distribution all over the surface of the object to be detected), it is also possible to use a point color sensor which can discriminate color, instead of the color image sensor. Further, when the data base section 8 is formed, it is also possible to use the point color sensor which can discriminate color, instead of the color image sensor. As the example of the point color sensor, a compact sensor composed of a single color pixel or a small number of color pixels can be used, for instance, When the temperature distribution on the surface of an object to be measured is required to be obtained, it is necessary to measure the color distribution on the surface of the object by use of color image sensors.

Here, since the color CCD camera 6 is composed of a great number of pixels, it is possible to detect image color data at spacial positions for each pixel corresponding to each spacial position of the coloring member 2. The image processing and calculating means 7 processes the image color data detected by the CCD camera 6 to eliminate noise and to smoothen the image color data, and then calculates the tristimulus values of the coloring member 2 at each spacial position of the coloring member 2.

On the other hand, the data base section 8 can be formed by use of a reference coloring member 3 formed of the same substance as the coloring member 2, by changing the physical quantity (e.g, temperature) of the reference coloring member 3 with the use of physical quantity changing means 4 (e.g., heating means), and by detecting the color condition of the reference coloring member 3 due to changes of the physical quantity with the use of the color detecting means 5.

In the data base section 8, a three-dimensional color space 10 is constructed by allowing each of the color tristimulus values of the reference coloring member 3 detected by the color detecting means 5 to correspond to each of the three coordinates of the color space 10. When the physical quantity is temperature, for instance, the temperature of the reference coloring member 3 is detected by known temperature detecting means, and the tristimulus values of the detected color are obtained by the color detecting means 5. Further, in the data base section 8, the relationship between the detected temperatures and the obtained tristimulus values are plotted in the three-dimensional color space 10, as shown in FIG. 1(a).

Figure 1:
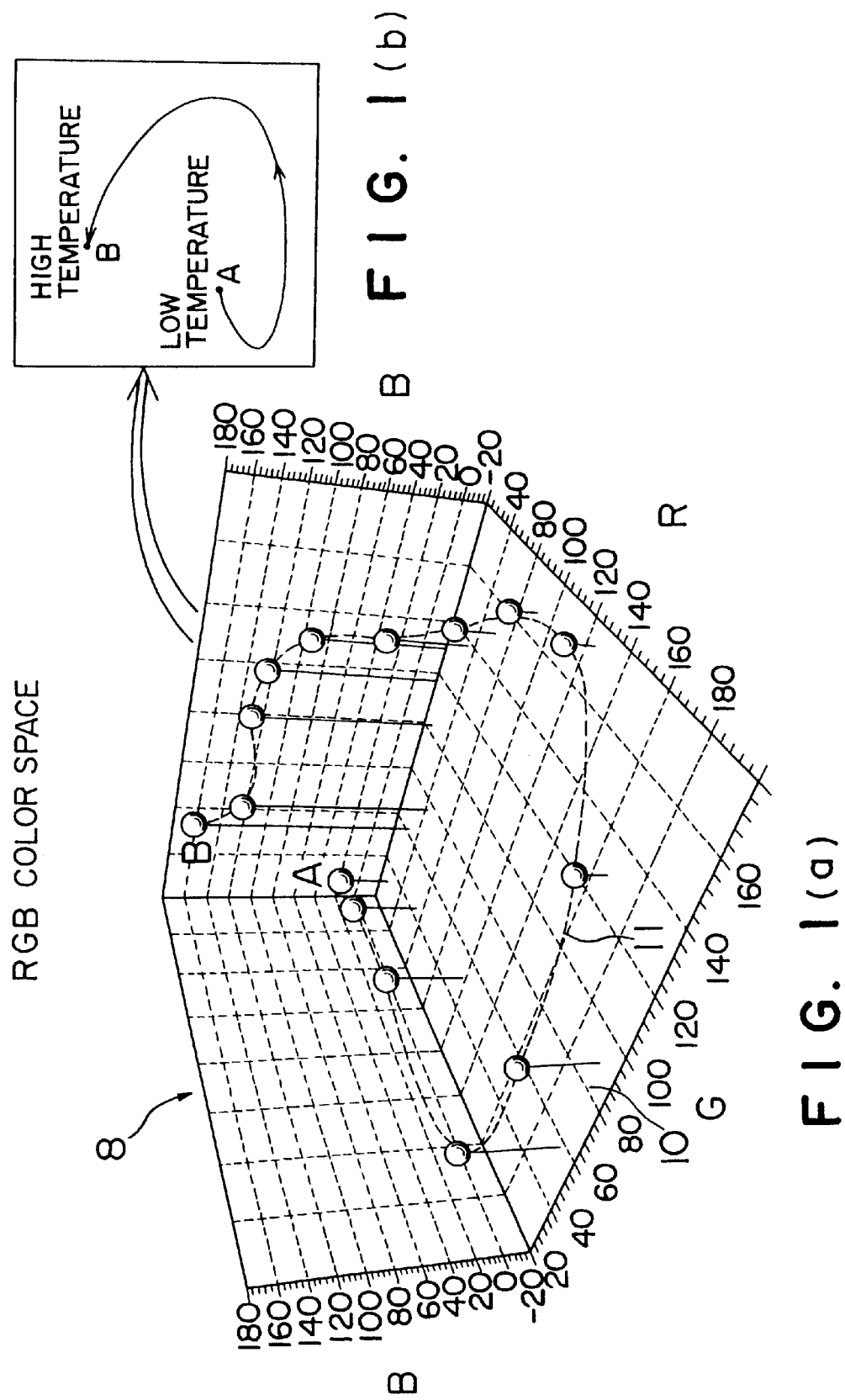
FIG. 1(a) is an illustration showing an RGB space adopted as the three-dimensional color space.
FIG. 1(b) is the contents of the data base section of the measuring apparatus according to the present invention.

Further, FIG. 1(a) shows the case where the reference coloring member 3 is provided in addition to the coloring member 2. Without being limited thereto, it is also possible to use in common both the coloring member 2 and the reference coloring member 3.

The practical example of the data base section 8 will be explained hereinbelow.

In the data base section 8 shown in FIGS. 1(a) and 1(b), RGB values are adopted as the tristimulus values of the color, and each of the tristimulus values R. G and B is allocated to each of the three coordinates of the three-dimensional color space 10, in order to form a three-dimensional RGB color space 10 and to show the relationship between the liquid crystal temperature and the RGB values of the liquid crystal.

In FIG. 1(b), a point A indicates the lowest temperature condition, and a point B indicates the highest temperature condition. Therefore, when the temperature is raised from the point A to the point B, it is possible to obtain the color-temperature calibration curve 11, by measuring the temperature of the liquid crystal at each point by use of the known temperature detecting means, by calculating the RGB values in accordance with the known method by use of the color detecting means, and by plotting the calculated RGB values in the three-dimensional RGB color space 10.

As shown in FIG. 1(b), when the RGB values are arranged in the three-dimensional RGB color space 10, it is possible to recognize that the color data are arranged smoothly and continuously from the points A to B according to the temperature change thereof all over the coloring area of the liquid crystal.

In the data base section 8 shown in FIG. 1(a), there exist intervals of data between a measurement point of temperature and the RGB values and an adjacent measurement point thereof, respectively. However, these data intervals can be interpolated in accordance with the interpolation method where necessary.

A method of obtaining calibration data of the data base section 8 will be explained hereinbelow with reference to FIGS. 2 and 6.

First, as shown in FIG. 6, in step ST1, the color images of the liquid crystal are photographed by the color CCD camera 6 in sequence by changing the liquid crystal temperature of the reference coloring member 3 at a constant interval (e.g, 1° C.) by the physical quantity changing (i.e., temperature control) means 4. The photographed liquid crystal images are inputted to the image processing and calculating means 7.

Successively, in step ST2, the images inputted to the image processing and calculating means 7 are arranged as the color tristimulus values (e.g., RGB values), and then each of the Ri, Gi and Bi values corresponding to each temperature Ti is obtained at each measurement point i.

Further, in step ST3, the Ri, Gi and Bi data obtained at each temperature Ti are developed in the three-dimensional RGB color space 10. Further, these data are interpolated in the three-dimensional color space 10 where necessary, to obtain a color-temperature calibration curve 11. As the interpolation method, it is possible to execute the liner interpolation or a high-order interpolation for obtaining a smoother calibration curve.

Figure 2:
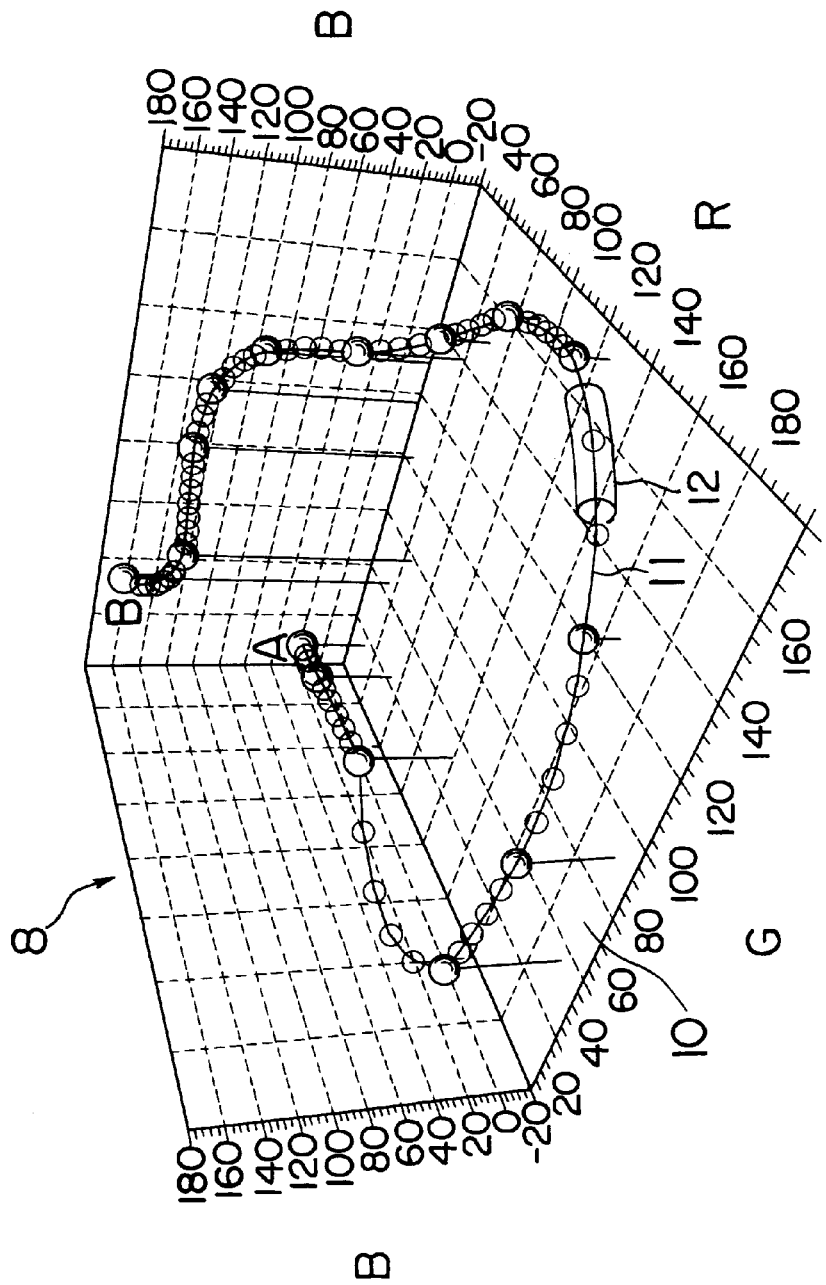
FIG. 2 is an illustration showing a color-temperature calibration curve, obtained by interpolating the color-temperature calibration curve shown in FIG. 1(a)

FIG. 2 shows an interpolated curve obtained by executing sequential quadratic interpolation for the data existing at three continuous points, respectively. When the color data are interpolated as described above, it is possible to develop a string-shaped color-temperature calibration curve 11 in the three-dimensional color space 10 as a calibration line. Further, instead of the color-temperature curve 11 developed as the calibration line, it is also possible to form a calibration table obtained by the correspondence between each temperature Ti and the Ri, Gi and Bi values at each temperature Ti.

Successively, in steps from ST4 to ST6, the temperature of the object 1 is measured. In more detail, in step ST4, the images of the coloring member (liquid crystal) 2 attached to the object 1 to be measure is obtained by the color CCD camera 6.

Further, in step ST5, the RGB values are calculated by the image processing and calculating means 7 on the basis of the liquid crystal images obtained by the color CCD camera 6.

Further, in step ST6, with reference to the color-temperature calibration curve 11 obtained in step ST3, a point at which the RGB values calculated in step ST5 can be specified on the color-temperature calibration curve 11 is obtained, and then the temperature of the object 1 to be measured is calculated by the physical quantity calculating means 9.

Here, the color-temperature calibration curve 11 is a curve along which the corresponding relationship between the temperature and the color tristimulus values (RGB values) has been obtained on the basis of the physical nature of the coloring member. Therefore, as far as the RGB values of the coloring member 2 can be obtained, it is natural that the point specified by the obtained RGB values in the three-dimensional color space 10 lies on the color-temperature calibration curve 11 from the theoretical standpoint.

In practical temperature measurement, however, the point specified by the obtained RGB values in the three-dimensional color space 10 does not necessarily lie accurately on the color-temperature calibration curve 11.

One of the reasons is that the color characteristics of the thermo-sensible liquid crystal somewhat differ according to the illumination angle or the visual angle. Therefore, for instance, when there exists a difference in the illumination and visual angles between the step of forming the color-temperature calibration curve 11 by use of the reference coloring member 3 and the step of detecting the images of the coloring member 2 to obtain the temperature of the object 1 to be measured, the point specified by the obtained RGB values in the three-dimensional color space 10 does not necessarily lie on the color-temperature calibration curve 11.

Accordingly, it is necessary to obtain the liquid crystal images of the coloring member 2, under the same illumination and visual angle conditions as when the color-temperature calibration curve 11 is formed for calibration.

However, there exists the case where it is impossible to secure the same illumination and visual angle conditions between both the steps. In this case, the reliability of the measurement data can be improved by the following processing:

The color images of the coloring member 2 of liquid crystal sprayed or attached onto the object 1 to be measured are photographed by the color CCD camera 6. Then, the RGB values thereof are obtained for each pixel of the color CCD camera 6. Successively, a plurality of the pixels are classified into appropriate groups, and the RGB values of the pixels included in each group are averaged and then processed statistically, to extract the RGB values from which errors are excluded for each group. The RGB values obtained for each group as described above are substituted for the color-temperature calibration curve 11, to obtain the temperature corresponding to each group.

In addition, as another method of excluding the error included from the actually measured data, the following processing can be adopted:

The color-temperature calibration curve 11 must be a curve having no thickness from an idealistic viewpoint. Therefore, when an allowable error width of the RGB values is assumed and further the color-temperature calibration curve 11 is enclosed, it is possible to obtain an allowable error range curved pipe 12 extending along the color-temperature calibration curve 11, as shown in FIG. 2. The formed curved pipe 12 is stored in the data base section 8. Further, in FIG. 2, only a part of the allowable error range curved pipe 12 extending along the color-temperature calibration curve 11 is shown.

Therefore, as far as the RGB values obtained by actually measuring the coloring member 2 lie within the allowable error range pipe 12, the measured data can be adopted as reliable data. That is, a point on the color-temperature calibration curve 11 existing the shortest distance away from the point specified by the RGB values in the three-dimensional color space 10 is obtained, and a temperature corresponding to the obtained point is adopted as the measured temperature. Further, when the RGB values obtained by actually measuring the coloring member 2 do not lie within the allowable error range pipe 12, the measured data are discriminated as being not reliable, so that the measured data are not adopted.

Further, the physical quantity calculating means 9 includes calibration on-line discriminating means for discriminating whether the tristimulus values of the detected color of the coloring member lie on the color-temperature calibration curve 11 or not. Further, the physical quantity calculating means 9 includes allowable error range in-pipe discriminating means for discriminating whether the tristimulus values of the detected color of the coloring member lie in the allowable error range pipe 12 or not.

In the above-mentioned embodiment, the case where the RGB values are adopted as the color tristimulus values has been described. Instead of the RGB values, however, it is also possible to adopt L*a*b* values as the color tristimulus values, for instance.

Figure 3:
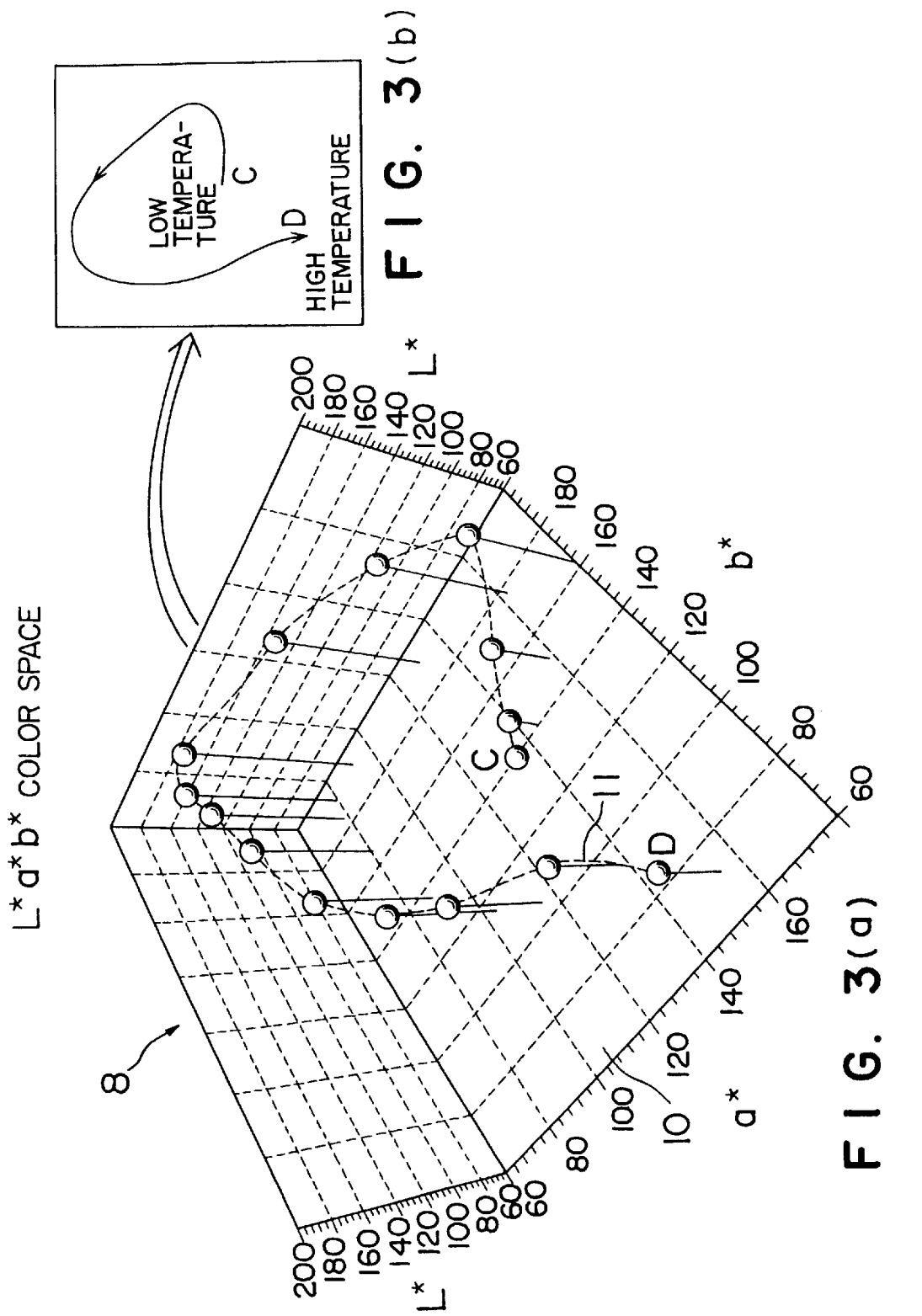
FIG. 3(a) is an illustration showing an L*a*b system color space adopted as the three-dimensional space.
FIG. 3(b) is the contents of the data base section of the measuring apparatus according to the present invention.

FIGS. 3(a) and 3(b) show an example of a color-temperature calibration curve 11 obtained by plotting the obtained L*a*b* values in the three-dimensional color space 10. In the obtained L*a*b* color space, it can be recognized that the color data can be arranged smoothly and continuously from a low temperature point C to a high temperature point D, in the same way as with the case of the RGB color space.

Figure 4:
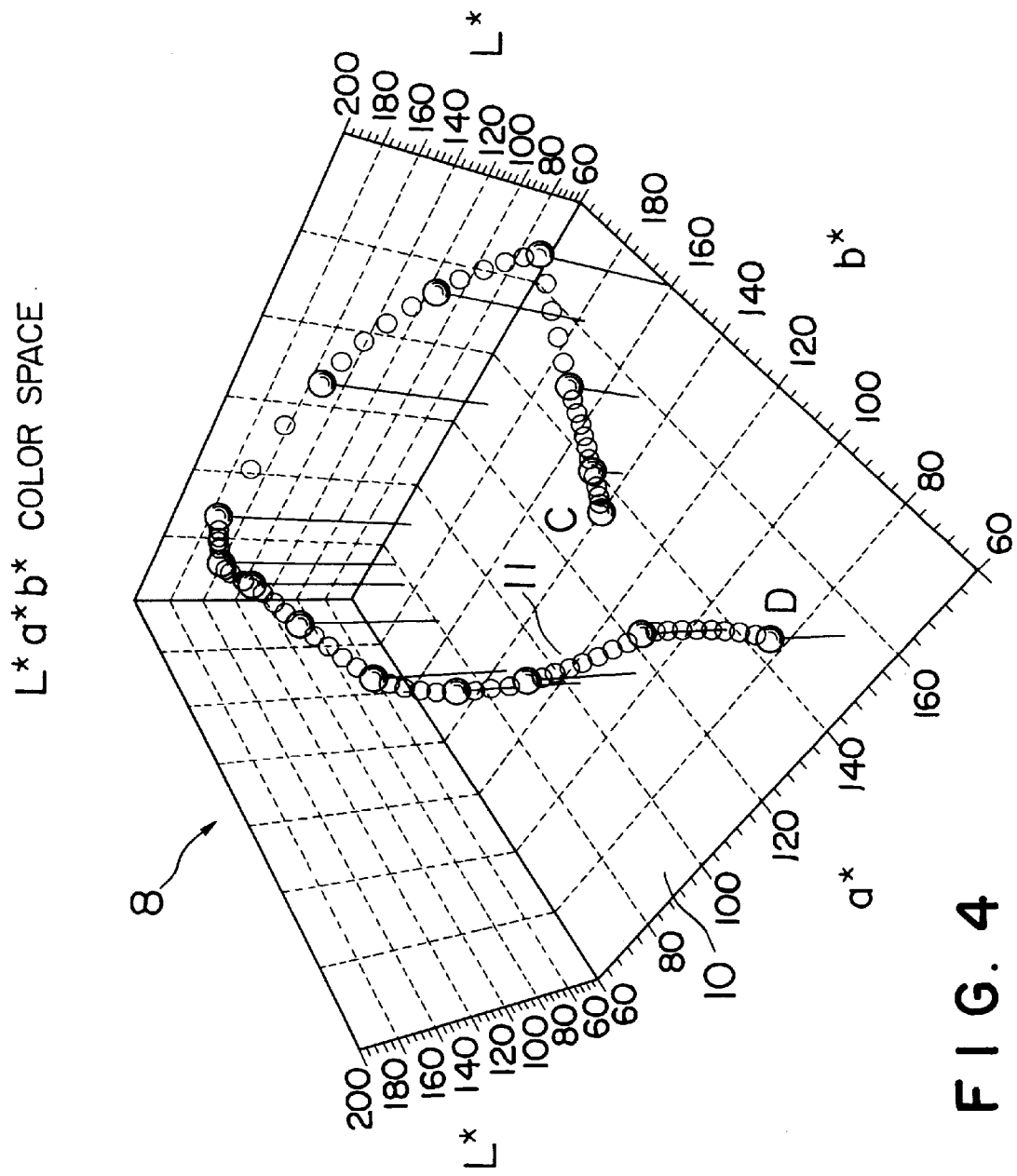
FIG. 4 is an illustration showing a color-temperature calibration curve, obtained by interpolating the color-temperature calibration curve shown in FIG. 3(a)

Further, FIG. 4 shows the color-temperature calibration curve 11 obtained by interpolating the color data shown in FIG. 3(a) in accordance with the interpolation method. Further, the present embodiment can be applied to the cases where an HSI system display, an XYZ system display, etc. are adopted as the tristimulus values, in addition to the RGB system display and the L*a*b* system display.

As described above, in the first embodiment of the present invention, since the relationship between the physical quantity (e.g., temperature) and the tristimulus values of color can be formed in a three-dimensional color space 10, and the formed three-dimensional color space 10 is stored in the data base section 8, it is possible to obtain the correspondence between the physical quantity (e.g., temperature) and the color tristimulus values in accordance with a one-value function all over the coloring area of the coloring member, so that a wide-range temperature measurement can be made in a wide area of an object to be measured.

As a result, it is possible to construct an easy temperature measuring system utilizing the whole coloring area of the liquid crystal, without need of any additional device (e.g., filters) and any complicated processing. Therefore, the two- or three-dimensional wide-range temperature measurement can be made by preparing only the general-purpose CCD camera and the color data processing (e.g., RGB system).

Further, in general, when the liquid crystal is colored, color non-uniformity somewhat occurs. Therefore, after the color is converted into the temperature, there inevitably exists a measurement error. In the present embodiment, however, when the color data are allowed to correspond to the color-temperature calibration curve 11, the corresponding relationship between the two can be somewhat controlled. In practice, since the reliable data can be discriminated on the basis of a distance between the data and the calibration curve, it is possible to easily decide an allowable error range of color non-uniformity during the measurement.

A second embodiment of the measuring apparatus according to the present invention will be described hereinbelow with reference to the attached drawings.

Figure 9:
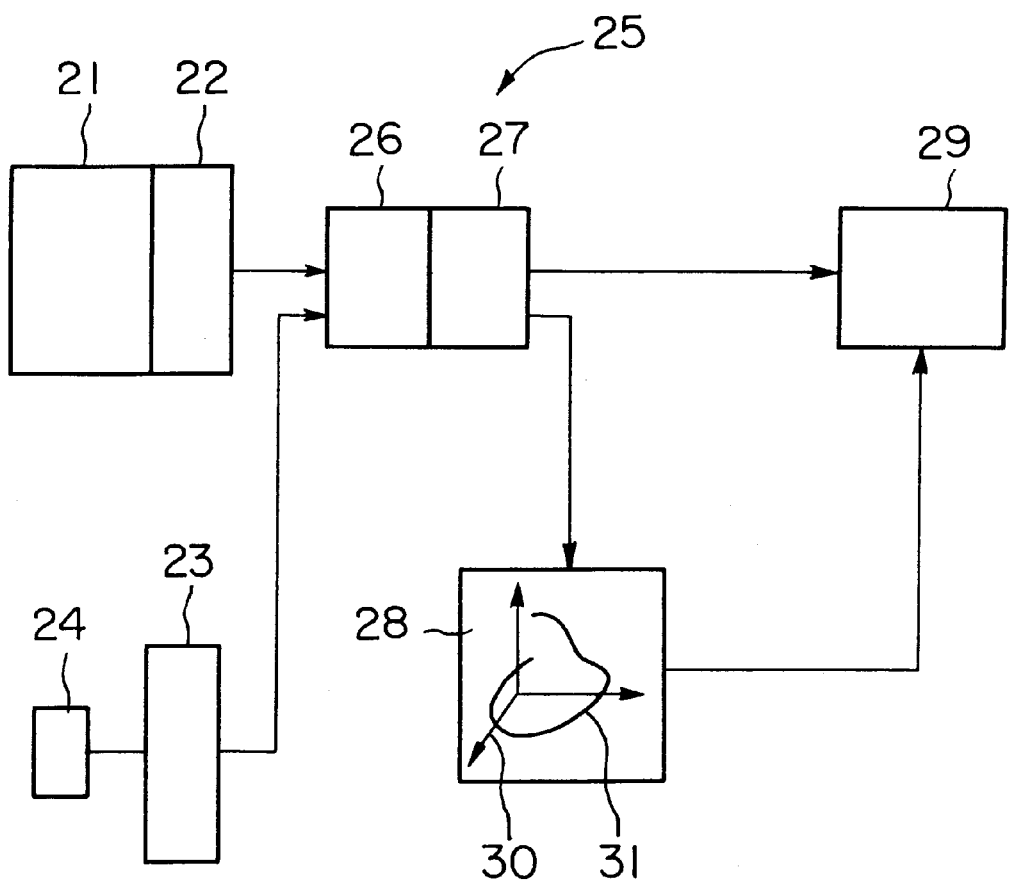
FIG. 9 is a block diagram showing a second embodiment of the measuring apparatus according to the present invention.

In FIG. 9, the measuring apparatus comprises a micro gap 22 (considered as a coloring member, equivalently) for producing an interference fringe when a magnetic disk apparatus 21 is irradiated with light, color detecting means 25 for detecting the color condition of the micro gap 22, a data base section 28, and physical quantity calculating means 29 for obtaining color tristimulus values on the basis of the color condition of the micro gap 22 detected by the color detecting means 25 with reference to the data base section 28 and for calculating a gap or a flying height H of a magnetic head 40 (as the physical quantity) on the basis of the obtained tristimulus values.

Figure 12:
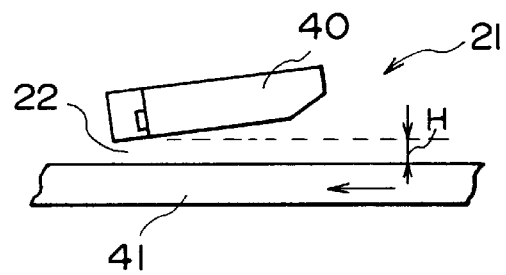
FIG. 12 is an illustration for assistance in explaining the floated quantity H of the optical head at a gap formed between the optical head and a magnetic disk.
Figure 13:
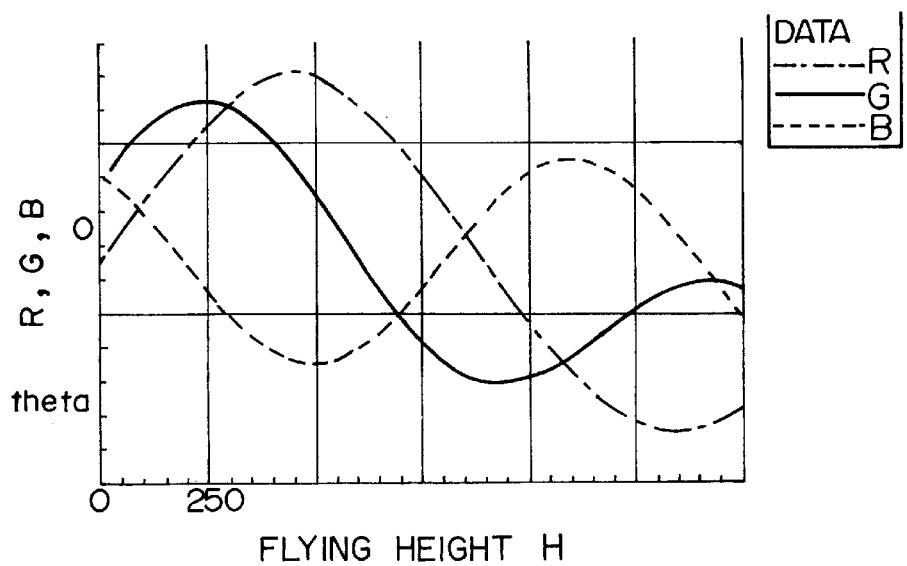
FIG. 13 is a graphical representation showing a prior art relationship between the RGB values of the interference pattern formed at the gap and the floating quantity H (gap width)

As shown in FIG. 12, the micro gap 22 of the magnetic disk apparatus 21 is formed between a magnetic head 40 (a first member) and a magnetic disk 41 (a second member). The micro gap 22 can be represented by a flying height H of the optical head 40 away from the surface of the magnetic disk 41. In FIG. 12, an arrow B indicates the rotational direction of the magnetic disk 41.

The color detecting means 25 comprises a color CCD camera (as a color image sensor) 26 and image processing and calculating means 27.

Figure 11:
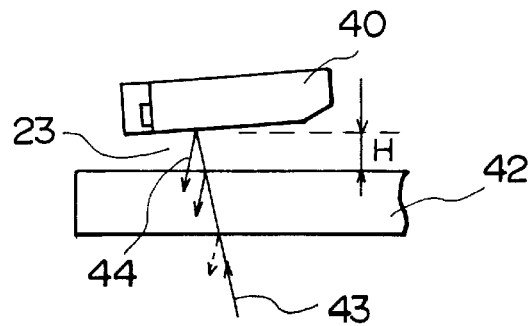
FIG. 11 is an illustration for assistance in explaining the generation of the interference pattern, when a gap is formed between an optical head and a pseudo-magnetic disk and further light is irradiated thereupon.

The data base section 28 can be formed as follows:

As shown in FIG. 11, a reference micro gap 23 is formed between a pseudo magnetic disk 42 and the magnetic head 40. As the pseudo magnetic disk 42, a light transmissive member having a high flatness can be used. The flying height H of the magnetic head 40 from the pseudo-magnetic disk 42 can be changed by moving the magnetic head 40 up and down by use of physical quantity changing means 24 (e.g, micro displacement controlling means). When light is allowed to be incident upon the micro gap 22, an interference fringe 44 can be formed by the light interference produced at the reference micro gap 23. In this case, since another interference fringe produced between both side surfaces of the pseudo magnetic disk 42 can be discriminated and further eliminated, it is possible to extract only the interference fringe produced at the micro gap 22 for image processing. The color condition of the interference fringe produced between the reference micro gap 23 can be detected by the color detecting means 25 in correspondence to the change of the flying height H of the magnetic head 40.

In the data base section 28, a three-dimensional color space 30 is constructed by allowing each of the color tristimulus values of the reference coloring member using the pseudo magnetic disk 42 to correspond to each of the three coordinates of the color space 30. That is, the data base section 28 can be obtained by plotting the relationship between the flying height H and the tristimulus values in the three-dimensional color space 30.

The practical example of the data base section 28 will be explained hereinbelow.

Figure 10:
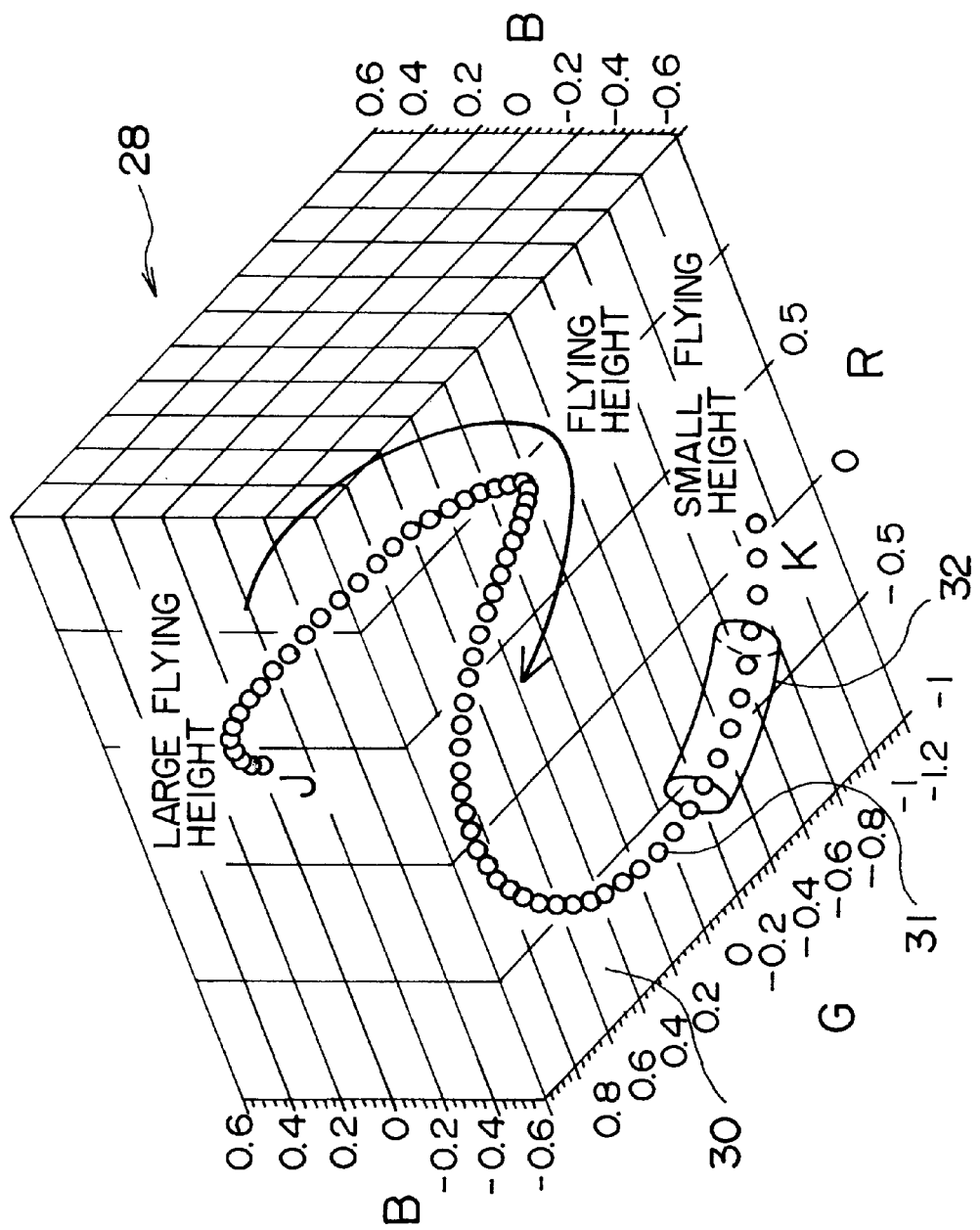
FIG. 10 is an illustration showing an RGB space adopted as the three-dimensional color space, in which a color-floating quantity calibration curve is shown.

In the data base section 10 shown in FIG. 10, RGB values are adopted as the tristimulus values of the color, and each of the tristimulus values R, G and B is allocated to each of the three coordinates of the three-dimensional color space 30, in order to form a three-dimensional RGB color space 30 and to show the relationship between the flying height H of the magnetic head 40 and the RGB values of the interference fringe obtained by the flying height H.

In FIG. 10, a point J indicates the largest flying height, and a point B indicates the lowest flying height. Therefore, when the magnetic head 40 is lowered from the point J to the point K, it is possible to obtain the color-flying height calibration curve 31, by measuring the flying height H at each point by use of the known micro displacing means, by calculating the RGB values in accordance with the known method by use of the color detecting means 25, and by plotting the calculated RGB values in a three-dimensional RGB color space 30.

As shown in FIG. 10, when the RGB values are arranged in the three-dimensional RGB color space 30, it is possible to recognize that the color data can be arranged smoothly and continuously from the point J to the point K according to the micro gap change all over the coloring area of the interference fringe.

In the data base section 28 shown in FIG. 10, there exist data intervals between a measurement point of the flying height and the RGB values and an adjacent measurement point thereof, respectively. However, these data intervals can be interpolated in accordance with the interpolation method where necessary.

A method of obtaining calibration data of the data base section 28 will be explained hereinbelow with reference to FIG. 14.

First. as shown in FIG. 14, in step ST11, the color images of the interference fringe 44 are photographed by the color CCD camera 26 in sequence by changing the flying height H of the magnetic head 40 relative to the surface of the pseudo magnetic disk 42 at a constant interval (e.g, 0.02 $\mu$m) by the micro displacement controlling means 24. The photographed interference fringe images are inputted to the image processing and calculating means 7.

Successively, in step ST12, the images inputted to the image processing and calculating means 27 are arranged as the color tristimulus values (e.g., RGB values), and then each of the Ri, Gi and Bi values corresponding to each flying height Hi is obtained.

Further, in step ST13, the Ri, Gi and Bi data corresponding at each flying height Hi are developed in the three-dimensional RGB color space 30. Further, these data are interpolated in the three-dimensional color space 30 where necessary, to obtain a color-flying height calibration curve 31. As the interpolation method, it is possible to execute the liner interpolation or a high-order interpolation for obtaining a smoother calibration curve.

FIG. 10 shows an interpolated curve obtained by executing sequential quadratic interpolation for the data existing at three continuous points, respectively. When the color data are interpolated as described above, it is possible to develop a string-shaped color-flying height calibration curve 30 as a calibration line. Further, instead of the color-flying height calibration curve 31 developed as the calibration line, it is also possible to form a calibration table obtained by the correspondence between each flying height Hi and the Ri, Gi and Bi values at each flying height Hi, respectively.

Successively, in steps from ST14 to ST16, the interference fringe of the magnetic head 40 is measured. That is, in step ST14, the images of the interference fringe are obtained by irradiating light 43 to the micro gap 22 between the magnetic disk 41 and the magnetic head 40 (as shown in FIG. 11) and further by the photographing the produced interference fringe by use of the color CCD camera 26.

Further, in step ST15, the RGB values are calculated by the image processing and calculating means 27 on the basis of the interference fringe images obtained by the color CCD camera 26.

Further, in step ST16, with reference to the color-flying height calibration curve 31 obtained in step ST13, a point at which the RGB values calculated in step ST15 can be specified on the color-flying height calibration curve 31 is obtained, and then the flying height H of the magnetic head 40 is calculated by the physical quantity calculating means 29.

Here, the color-flying height calibration curve 31 is a curve along which the corresponding relationship between the flying height H and the color tristimulus values (RGB values) has been obtained on the basis of the physical nature of the micro gap 22. Therefore, as far as the RGB values of the interference fringe can be obtained, it is natural that the a point specified by the obtained RGB values in the three-dimensional color space 30 lies on the color-flying height calibration curve 31 from the theoretical standpoint.

In the practical flying height measurement, however, the point specified by the obtained RGB values in the three-dimensional color space 30 does not necessarily lie accurately on the color-flying height calibration curve 31.

One of the reasons is that the interference fringe at the micro gap 22 somewhat differs according to the illumination angle or the visual angle. Therefore, for instance, when there exists a difference in the illumination and visual angles between the step of forming the color-flying height calibration curve 31 by use of the reference micro gap 23 and the step of obtaining the flying height H at the actual micro gap 22 to be measure, the point specified by the obtained RGB values in the three-dimensional color space 30 does not necessarily lie on the color-flying height calibration curve 31.

Accordingly, it is necessary to obtain the interference fringe images at the micro gap 22, under the same illumination and visual angle conditions as when the color-flying height calibration curve 31 is formed for calibration.

However, there exists the case where it is impossible to secure the same illumination and visual angle conditions between both the steps. In this case, the reliability of the measurement data can be improved by the following processing:

The color-flying height calibration curve 31 must be a curve having no thickness from an idealistic viewpoint. Therefore, when an allowable error width of the RGB values is assumed and further the color-flying height calibration curve 31 is enclosed, it is possible to obtain an allowable error range curved pipe 32 extending along the color-flying height calibration curve 31, as shown in FIG. 10. The formed curved pipe 32 is stored in the data base section 28. Further, in FIG. 10, only a part of the allowable error range curved pipe 32 extending along the color-flying height calibration curve 31 is shown.

Therefore, as far as the RGB values obtained by actually measuring the flying height H at the micro gap 22 lie within the allowable error range pipe 32, the obtained data are adopted as reliable data. That is, a point on the color-flying height calibration curve 31 existing the shortest distance away from the point specified by the RGB values in the three-dimensional color space 30 is obtained, and a flying height corresponding to the obtained point is adopted as the measured flying height. Further, when the RGB values obtained by actually measuring the flying height H do not lie within the allowable error range pipe 32, the measured data are discriminated as being not reliable for some reasons, so that the measured data are not adopted.

Further, the physical quantity calculating means 29 includes calibration on-line discriminating means for discriminating whether the tristimulus values of the detected interference fringe lie on the color-flying height calibration curve 31 or not. Further, the physical quantity calculating means 29 includes allowable error range in-pipe discriminating means for discriminating whether the tristimulus values of the detected interference fringe lie in the allowable error range pipe 32 or not.

Further, although an example of the error processing methods has been described by way of example, there are many other error processing methods.

Further, in the above-mentioned embodiment, the case where the RGB values are adopted as the color tristimulus values has been described. Instead of the RGB values, it is also possible to adopt L*a*b* values as the color tristimulus values, for instance. Further, the present embodiment can be applied to the cases where an HSI system display, an XYZ system display, etc. are adopted as the tristimulus values, in addition to the RGB system display and the L*a*b* system display.

As described above, in the second embodiment of the present invention, since the relationship between the flying height H of the magnetic head 40 (as the physical quantity) and the color tristimulus values of the interference fringe is represented in the three-dimensional color space 30, and the formed three-dimensional color space 30 is stored in the data base section 8, it is possible to obtain the correspondence between the flying height H of the magnetic head and the color tristimulus values of the interference pattern as a one-value function all over the coloring area of the interference fringe, so that the measurement of the flying height H can be made in a wide area thereof.

As a result, it is possible to easily measure the flying height H difficult to measure in general by preparing only the general-purpose CCD camera and the color data processing (e.g., RGB system).

Further, in general, when the interference fringe is produced, color non-uniformity somewhat occurs. Therefore, after the color is converted into the flying height H, there inevitably exists a measurement error. In the present embodiment, however, when the color data are allowed to correspond to the color-flying height calibration curve 31, the corresponding relationship between the two can be somewhat controlled. In practice, since the reliable data can be discriminated on the basis of a distance between the data and the calibration curve, it is possible to easily decide the allowable error range of the color non-uniformity during the measurement.

Further, in the above-mentioned method, although the flying height H of the magnetic head 40 has been measured on the basis of the micro gap between the magnetic head 40 (as the first member) and the magnetic disk 41 (as the second member), without being limited only thereto, it is also possible to set a semiconductor wafer as the first member and a reference flat body such a glass plate of high flatness as the second member. In this case, it is possible to measure the flatness of the semiconductor wafer in the same way as with the case of the flying height H.

In the above-mentioned description, although the measuring apparatus and method according to the present invention have been explained by taking temperature or the flying height H related to a micro gap as the physical quantity and taking the liquid crystal and the micro gap as the coloring member, the physical quantity is not limited only to the temperature and the flying height, and in the same way the coloring member is not limited only to the chemical substance such as liquid crystal or the interference pattern. As far as the physical quantity can be allowed to correspond to the color tristimulus values as a one-valued function in the three-dimensional color space, magnetic field, electric field, pressure, etc. can be adopted as the physical quantity Further, a chemical substance other than liquid crystal can be also adopted as the coloring member.

According to the sorts of liquid crystal, there are some liquid crystals whose color changed according to pressure, electric field, and the other physical quantity, respectively. Further, in substances other than liquid crystal, there exist many chemical substances whose color changes according to various physical quantities. When a chemical substance whose color changes according to pressure is used, it is possible to obtain a wide pressure distribution in the same way as with the case of the above-mentioned embodiments. Further, when a chemical substance whose color changes according to electric field is used, it is possible to obtain a wide electric field distribution in the same way as with the case of the above-mentioned embodiments. Further, when there exists a chemical substance whose color changes according to a physical quantity other than above, it is possible to easily obtain a detailed quantitative distribution in the same way as above.

What is claimed is:

1. A measuring apparatus, comprising:
   a coloring member whose color condition changes according to change of a predetermined physical quantity;
   color detecting means for detecting the color condition of said coloring member;
   a data base section for constructing a three-dimensional color space having three coordinate axes corresponding to each of tristimulus values of color of said coloring member, a relationship between the predetermined physical quantity and the tristimulus values being represented in the three-dimensional color space as a single valued function; and
   physical quantity calculating means for calculating the physical quantity of an object to be measured on the basis of the tristimulus values of color of said coloring member detected by said color detecting means and with reference to said relationship in said data base section.

2. The measuring apparatus of claim 1, wherein said color detecting means comprises:
   a color sensor for detecting the color condition of said coloring member; and
   calculating means for calculating the tristimulus values on the basis of the color condition detected by said color sensor.

3. The measuring apparatus of claim 2, wherein:
   said color sensor is an image sensor for detecting the color condition at each spacial position of said coloring member; and
   said calculating means is image processing and calculating means for calculating the tristimulus values at each spacial position on the basis of the color condition at each spacial position detected by said color image sensor.

4. The measuring apparatus of claim 3, wherein:
   said color image sensor detects the color condition at each spacial position at a plurality of pixels; and
   said calculating means calculates the tristimulus values at each spacial position by processing the color condition data detected at the pixels statistically.

5. The measuring apparatus of claim 2, wherein:
   said color sensor is a color point sensor for detecting the color condition at each spacial position of said coloring member; and
   said calculating means is image processing and calculating means for calculating the tristimulus values at each spacial position on the basis of the color condition at each spacial position detected by said color point sensor.

6. The measuring apparatus of claim 1, wherein said data base section has a calibration line obtained by representing the relationship between the predetermined physical quantity and the tristimulus values in the three-dimensional color space.

7. The measuring apparatus of claim 6, wherein the predetermined physical quantity is obtained on the calibration line represented in the three-dimensional space as a one-valued function.

8. The measuring apparatus of claim 6, wherein the calibration line is a continuous line obtained by interpolating relationship between a plurality of the discrete physical quantities and a plurality of the discrete tristimulus values each corresponding to each of the discrete physical quantities.

9. The measuring apparatus of claim 6, wherein said data base section has an allowable error range pipe extending along the calibration line so as to enclose the calibration line in the three-dimensional color space.

10. The measuring apparatus of claim 6, wherein said physical quantity calculating means has calibration on-line discriminating means for discriminating whether the tristimulus values of the detected color of said coloring member lie on the calibration line or not.

11. The measuring apparatus of claim 9, wherein said physical quantity calculating means has allowable error range in-pipe discriminating means for discriminating whether the tristimulus values of the detected color of said coloring member lie in the allowable error range pipe or not.

12. The measuring apparatus of claim 1, wherein the predetermined physical quantity is temperature.

13. The measuring apparatus of claim 1, wherein said coloring member is a thermo-sensible liquid crystal member.

14. The measuring apparatus of claim 13, wherein said thermo-sensible member is sprayed onto a surface of an object to be measured.

15. The measuring apparatus of claim 13, wherein said thermo-sensible member is a sheet shaped liquid crystal member which is attached onto a surface of an object to be measured.

16. The measuring apparatus of claim 13, wherein said thermo-sensible member is mixed turbidly into an object to be measured.

17. The measuring apparatus of claim 1, wherein said coloring member is a gap formed between a first member and a second member so as to produce an interference pattern when irradiated by light.

18. The measuring apparatus of claim 17, wherein the first member is a head surface of a disk apparatus, and the second member is a disk surface.

19. The measuring apparatus of claim 18, wherein the first member is a semiconductor wafer whose flatness is to be measured, and the second member is a reference flatness body.

20. The measuring apparatus of claim 1, wherein the predetermined physical quantity is a gap width formed between the first member and the second member so as to produce an interference pattern when irradiated by light.

21. The measuring apparatus of claim 1, wherein the tristimulus values are RGB values.

22. The measuring apparatus of claim 1, wherein the tristimulus values are L*a*b* values.

23. A measuring method, comprising the steps of:

constructing a three-dimensional color space having three coordinate axes by allowing each value of tristimulus values of color to correspond to each of the coordinate axes;

changing a predetermined physical quantity for a coloring member whose color condition changes according to change of the physical quantity;

detecting the color condition of the coloring member to obtain the tristimulus values thereof according to various physical quantities;

constructing a data base section by representing a relationship between the various physical quantities and the tristimulus values in the three-dimensional color space as a single valued function;

detecting the tristimulus values of the coloring member included in an object to be measured; and calculating the physical quantity of the object to be measured with reference to the relationship in the data base section.

* * * * *